United States Patent
Drumm et al.

(10) Patent No.: US 11,097,795 B2
(45) Date of Patent: Aug. 24, 2021

(54) WEAR PAD FOR A CRAWLER TRACK OF A TRACKED VEHICLE, CRAWLER TRACK AND CONSTRUCTION MACHINE

(71) Applicant: Wirtgen GmbH, Windhagen (DE)

(72) Inventors: Stephan Drumm, Ockenfels (DE); Peter Busley, Linz (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 196 days.

(21) Appl. No.: 15/999,533

(22) PCT Filed: Feb. 14, 2017

(86) PCT No.: PCT/EP2017/053236
§ 371 (c)(1),
(2) Date: Aug. 17, 2018

(87) PCT Pub. No.: WO2017/140652
PCT Pub. Date: Aug. 24, 2017

(65) Prior Publication Data
US 2019/0337580 A1  Nov. 7, 2019

(30) Foreign Application Priority Data
Feb. 19, 2016 (DE) .................... 10 2016 202 626.7

(51) Int. Cl.
*B62D 55/275* (2006.01)
*B62D 55/28* (2006.01)
*B62D 55/32* (2006.01)

(52) U.S. Cl.
CPC .......... *B62D 55/275* (2013.01); *B62D 55/28* (2013.01); *B62D 55/32* (2013.01)

(58) Field of Classification Search
CPC .... B62D 55/28; B62D 55/286; B62D 55/275; B62D 55/32
See application file for complete search history.

(56) References Cited

U.S. PATENT DOCUMENTS 1,786,924 A * 12/1930 Turnbull ................ B62D 55/28
305/201
1,835,627 A * 12/1931 Bauer .................. B62D 55/205
305/201

(Continued)

FOREIGN PATENT DOCUMENTS

CN 206561891 U 10/2017
EP 1900621 A2 3/2008

(Continued)

OTHER PUBLICATIONS

Written Opinion from corresponding PCT/EP2017/053236 (not prior art).

(Continued)

*Primary Examiner* — Scott A Browne
(74) *Attorney, Agent, or Firm* — Lucian Wayne Beavers; Patterson Intellectual Property Law, PC

(57) ABSTRACT

In a wear pad for a crawler track (2) of a tracked vehicle, wherein the wear pad (1) comprises an outer tread surface (14), and a bottom side (16) opposite the tread surface (14) from which at least one protrusion (30) protrudes, the wear pad (1) comprises fastening means (26) for fastening to the crawler track (2), it is specified for the following features to be achieved: that the protrusion of the wear pad (1) on the bottom side (16) features a contour which extends, at least partially, at an angle deviating from the longitudinal direction (34) of the wear pad (1).

23 Claims, 6 Drawing Sheets

(56) References Cited

U.S. PATENT DOCUMENTS

Figure 1:
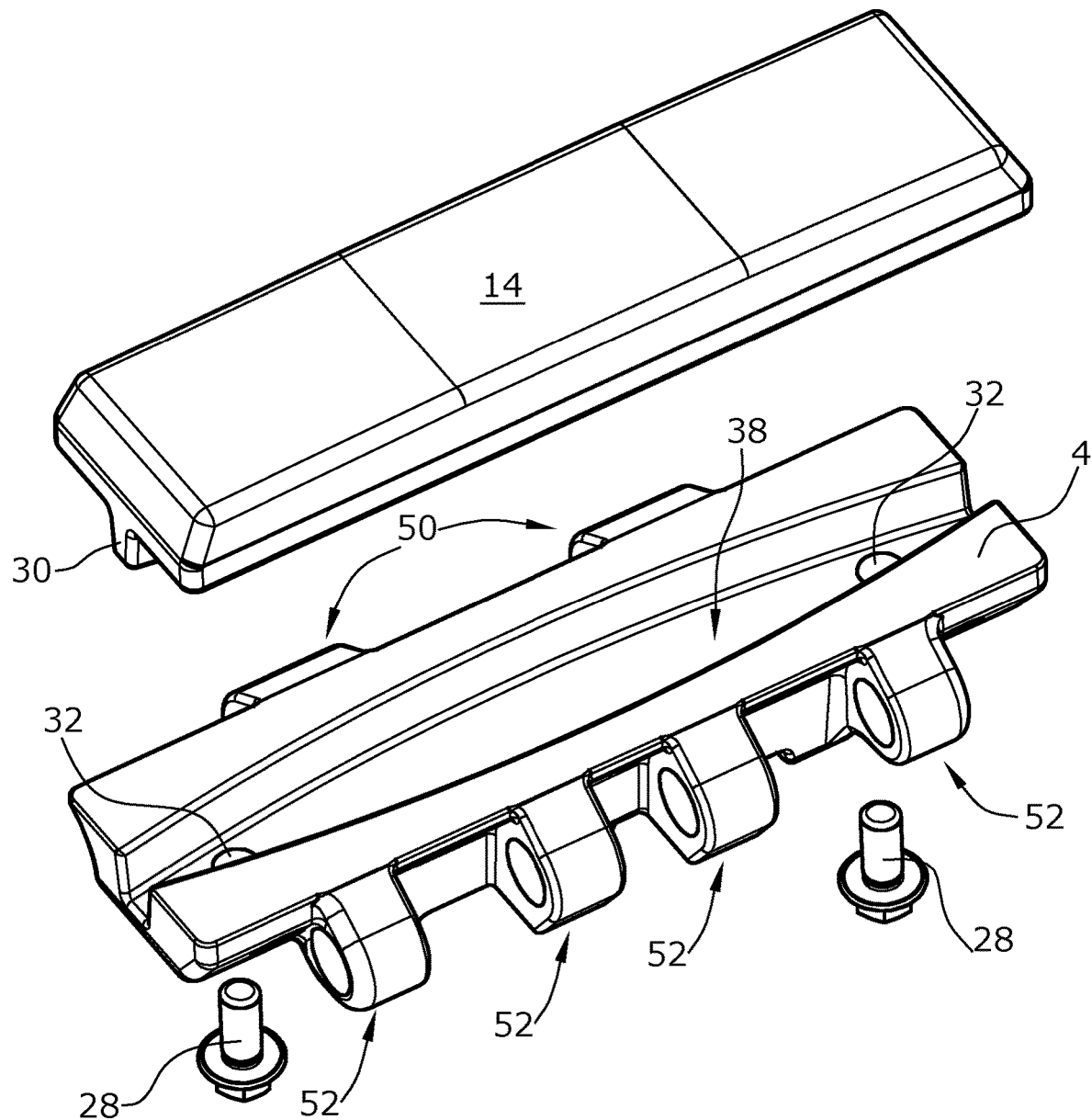

| | | | |
|---|---|---|---|
| D157,905 S * | 3/1950 | Risk | D15/28 |
| 3,475,060 A | 10/1969 | Kaifesh | |
| 5,353,029 A * | 10/1994 | Johnston | H01Q 17/00 342/1 |
| 5,630,657 A * | 5/1997 | Kumano | B62D 55/26 305/189 |
| 5,800,026 A | 9/1998 | Nagata | |
| 2008/0061626 A1 | 3/2008 | Busley et al. | |
| 2009/0278402 A1* | 11/2009 | Busley | B62D 55/275 305/46 |
| 2015/0321713 A1* | 11/2015 | Hall | B62D 55/28 305/192 |

FOREIGN PATENT DOCUMENTS

| | | | | |
|---|---|---|---|---|
| EP | 2588362 A1 | | 5/2013 | |
| JP | 58101880 A | | 6/1983 | |
| JP | 0456593 U | | 5/1992 | |
| JP | 2009173072 A | * | 8/2009 | B62D 55/26 |
| RU | 2443589 C1 | | 2/2012 | |

OTHER PUBLICATIONS

International Search report from corresponding PCT/EP2017/053236 (not prior art).

* cited by examiner

WEAR PAD FOR A CRAWLER TRACK OF A TRACKED VEHICLE, CRAWLER TRACK AND CONSTRUCTION MACHINE

The invention relates to an exchangeable wear pad for a crawler track of a tracked vehicle, in particular for construction machines, and a crawler track, as well as a construction machine, in particular road milling machine.

Exchangeable wear pads for crawler tracks are known from prior art which can be fastened to an intermediate plate of the crawler track in a detachable fashion.

The wear pads ordinarily comprise four screw bolts of fastening screws spaced in the longitudinal direction of the wear pad, protruding outward. The fastening screws are guided through reinforcing rails and are secured against torsion in a suitable fashion.

During the manufacture of said wear pads, the reinforcing rails with fastening screws arranged at their ends are cast in by the wear pad material.

It is of disadvantage in this design that the wear pad material also accumulates underneath the reinforcing rail during the cast-in operation. This has the disadvantage that the screw joints with an intermediate plate loosen again during operation as a result of the soft polyurethane material between the reinforcing rail and the intermediate plate so that the screw connections must be retightened at regular intervals. The polyurethane material between the reinforcing rail and the intermediate plate in fact prevents that the preload of the screw connection can be permanently maintained. It is understood that, with up to fifty wear pads per crawler track of a ground-engaging unit, and with four ground-engaging units per machine, the time effort for retightening the screw connections is significant, thus resulting in increased costs and an increased time requirement.

It is known from EP 1900621 that a contact collar of the reinforcing rail terminates essentially flush with the wear pad material of the wear pad so that the wear pad can be rigidly fastened to an intermediate plate via the screw connection. Two protrusions extending in the longitudinal direction of the wear pad protrude from the bottom side of the wear pad, which engage with the intermediate plate, as is evident from FIG. 10. Alternating transverse forces occur in particular during steering which act on the fastening means and may also lead to premature loosening of the fastening means between the intermediate plate and the crawler track, as well as between the wear pad and the intermediate plate.

An inclined position of the construction machine also generates high transverse forces which must be absorbed by the fastening means of the wear pad and the fastening means of the intermediate plate.

It is therefore the object of the invention to create a wear pad for a crawler track of the aforementioned kind, as well as a crawler track and a construction machine, by means of which the durability of the screw connections of a wear pad can be improved, and the manufacturing costs and the time effort for assembly and disassembly of the wear pads, respectively, and thus the maintenance costs, can be reduced.

The above mentioned object is achieved by the features of the claims.

The invention advantageously specifies for the protrusion of the wear pad to feature, on the bottom side facing the crawler track link, for the at least partial engagement with an indentation of the crawler track link adapted to the protrusion, an outer contour which extends, at least partially, at an angle deviating from the longitudinal direction of the wear pad.

As a result of the protrusion of the wear pad being at least partially in engagement with an indentation of the crawler track link adapted to said protrusion, transverse forces can be absorbed which, in particular during steering of the tracked vehicle, act in the longitudinal direction of the wear pad. The steering forces and/or inclined position of the crawler track transverse to the direction of movement of the crawler track generate an alternating load on the fastening means so that the screw connection of the wear pads may loosen under the action of alternating transverse forces and may require retightening of the screw connections. The outer contour of the protrusion protruding on the bottom side of the wear pad which, at least in part, extends at an angle deviating from the longitudinal direction of the wear pad absorbs the transverse forces and thus relieves the fastening means from the alternating load entirely or at least to a substantial extent. It is thus possible to use only two fastening means mutually spaced in the longitudinal direction of the wear pad so that the mounting effort for assembly and disassembly of the wear pad is reduced, effectively halved, and the manufacturing costs of the wear pad are also reduced.

In a particularly preferred embodiment, the angle is $\neq 0°$ and $\neq 90°$. The angle is preferably in the range from 20° to 70°, and particularly preferred 30° to 60°.

The protrusion preferably comprises two side faces extending essentially in the longitudinal direction, and two end faces preferably extending essentially perpendicular to the longitudinal direction. In this arrangement, for the purpose of absorbing transverse forces, the side faces of the protrusion feature the angle according to the invention to the longitudinal direction of the wear pad. The side faces may feature a constant distance in the longitudinal direction and, insofar, extend parallel to one another. Likewise, the distance between the side faces may vary in the longitudinal direction.

A further advantage is that an intermediate plate is no longer required between the crawler track link and the wear pad. Further fastening means between the crawler track and the intermediate plate are thus eliminated so that the overall effort for assembly and disassembly is substantially reduced.

It is particularly preferred for the protrusion to engage with an indentation complementary to the protrusion, which generates a form-fit at least in the longitudinal direction of the wear pad.

It is preferably specified for the wear pad to include, as a minimum, one reinforcing element, at least the major part of which is enclosed or cast in by wear pad material. The reinforcing element increases the stiffness of the wear pad in particular in the design of a reinforcing rail, and allows rigid fastening to the crawler track links without retightening of the fastening means becoming necessary before the tread surface of the wear pad is completely worn.

The wear pad may comprise at least two fastening means arranged at a distance to one another in the longitudinal direction of the wear pad which serve the purpose of fastening the wear pad to the crawler track link. In this design, the fastening means are preferably arranged on the bottom side in proximity to the free ends of the wear pad as seen in the longitudinal direction.

It is preferably specified for the reinforcing element to be integrated in the at least one protrusion of the wear pad. The part of the wear pad not forming the protrusion thus forms a wear coat which can be used up almost completely.

The fastening means may be integrated in the reinforcing element and may also be of integral design with the reinforcing element. Such fastening means enable safe fastening of the wear pad over the entire period of use of the wear pad.

In a preferred embodiment, it is specified for the reinforcing element, in the longitudinal direction of the wear pad, to terminate essentially flush with the wear pad material in at least two longitudinally spaced points of the reinforcing element embedded in the protrusion. It is thus possible for the reinforcing element to be in direct contact with the crawler track link in the two spaced points during loading of the fastening means so that the preload of the screw connection is permanently maintained and the fastening means do not loosen during the period of use.

In this design, it is preferably specified for the at least two points of the reinforcing element embedded in the protrusion that terminate essentially flush with the wear pad material to be arranged in the area of the fastening means of the reinforcing element. This offers the advantage that the preload applied by the fastening means is highest at the points of the reinforcing element which are in contact with the crawler track link.

In a particularly preferred embodiment, it is specified for the longitudinally extending wear pad to feature a length-to-width ratio between 2.5 and 5, preferably in the range between 3.5 and 4. The gaps between two wear pads of the crawler track can thus be kept small and a larger footprint of the crawler track be achieved at the same time.

It is preferably specified for the wear pad to protrude vis-à-vis the crawler track link at least on the outer side of the crawler track as seen transverse to the direction of movement. The crawler track link is thus protected from damage, for example, at kerbsides.

In a preferred embodiment, the ratio of the width transverse to the longitudinal direction of a wear pad to the return radius of the crawler track is in the range between 0.2 and 0.4, preferably between 0.25 and 0.3. Such a ratio, also called pitch, offers the advantage that the operational smoothness of the crawler track can be improved.

In one embodiment of the invention, it is specified for the protrusions of the wear pad to not extend linearly relative to the longitudinal direction of the wear pad, and namely to extend, at least in part, in a curved or undulating fashion relative to the longitudinal direction of the wear pad. Such a contour of the protrusions enables a form-fit with the crawler track link to be achieved, which allows high transverse force components to be absorbed that do not occur exclusively transverse to the direction of movement of the wear pad.

In an alternative embodiment of the invention, it may be specified for the protrusions of the wear pad to extend linearly in the longitudinal direction of the wear pad, and namely to extend, at least in part, in an oblique or angular fashion relative to the longitudinal direction of the wear pad. The outer contour of the protrusion may, for example, in the longitudinal direction and in top view, exhibit a zig-zag form or a saw tooth form. In this embodiment, transverse force components of different directions originating from the crawler track can also be absorbed and, as a result, the fastening means be relieved in particular from transverse forces entirely or at least to a substantial extent.

It may furthermore be specified for the protrusions of the wear pad to exhibit a different width in the longitudinal direction of the wear pad, or to be of stepped design at the end sides and/or the outer edges as seen in the longitudinal direction.

It is particularly preferred for the material of the wear pad to be made of an elastomer, preferably a polyurethane, which is preferably through-coloured in a bright fluorescent colour. Through-colouring results in the bright fluorescent colour being retained even in the case of wear of the wear pad.

The invention furthermore relates to a crawler track for tracked vehicles comprising multiple wear pads of the previously described kind, as well as to a construction machine comprising such crawler track.

Hereinafter, embodiments of the invention are illustrated in more detail with reference to the drawings.

Figure 2:
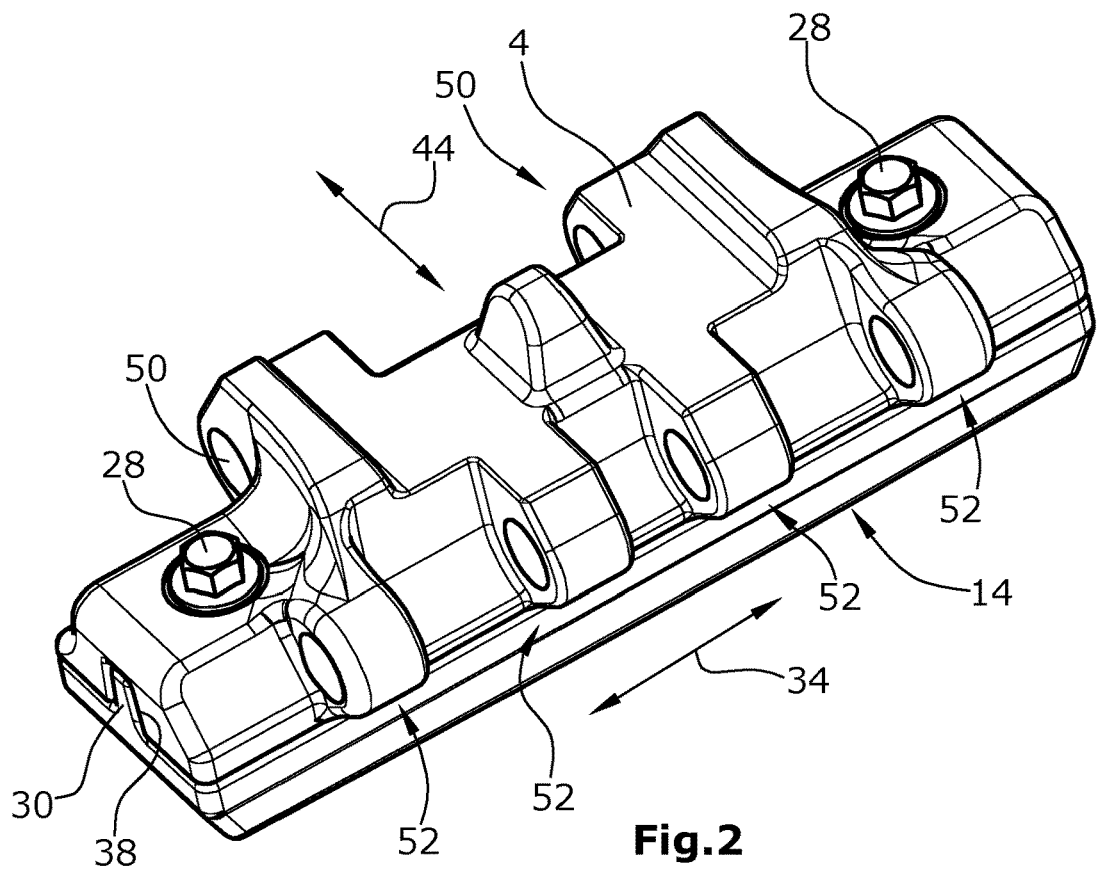
Figure 3:
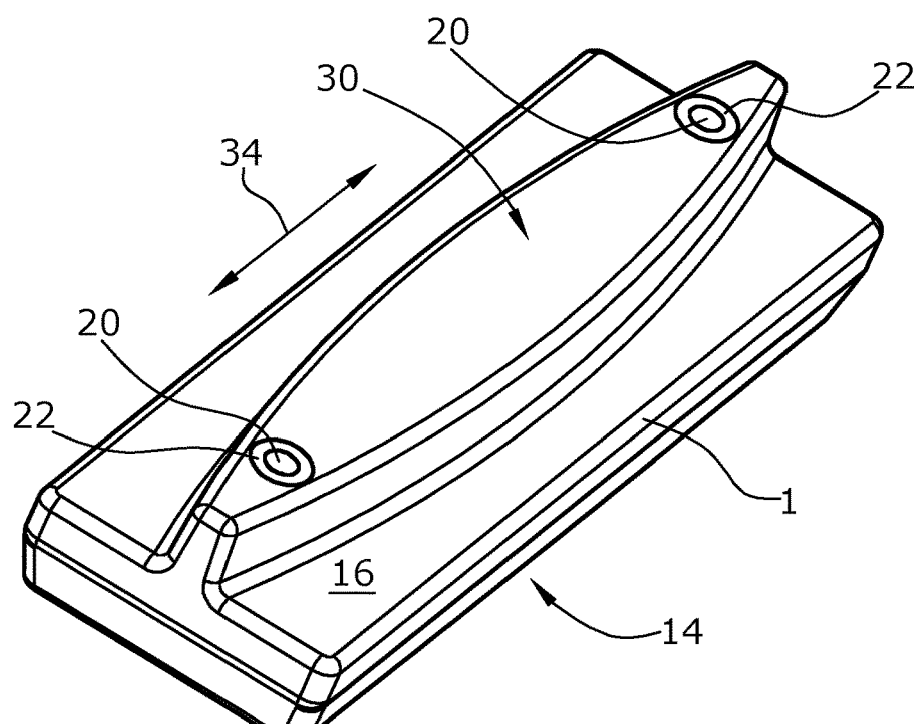
Figure 4:
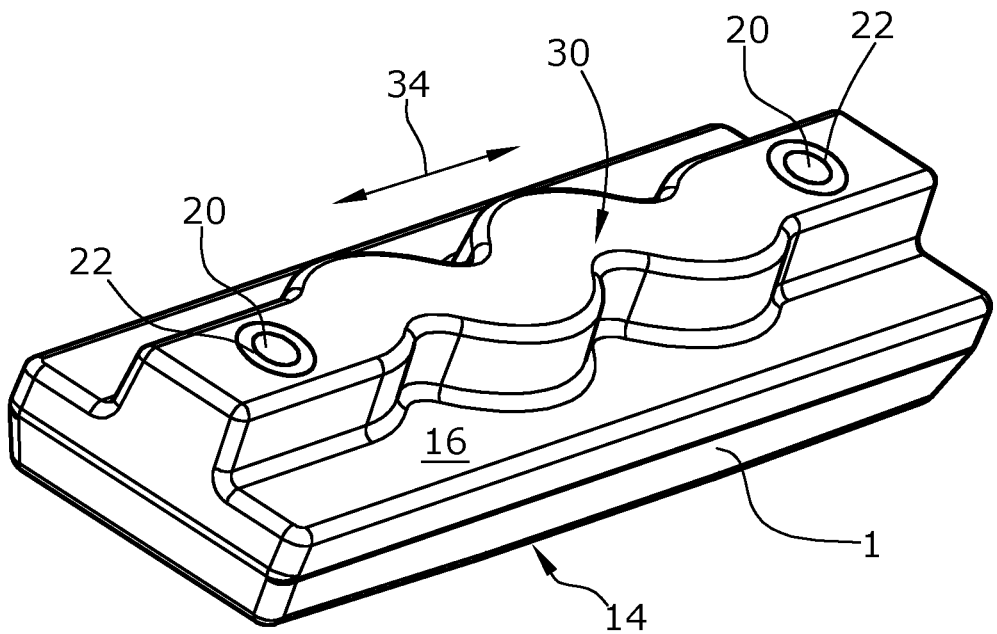
Figure 5:
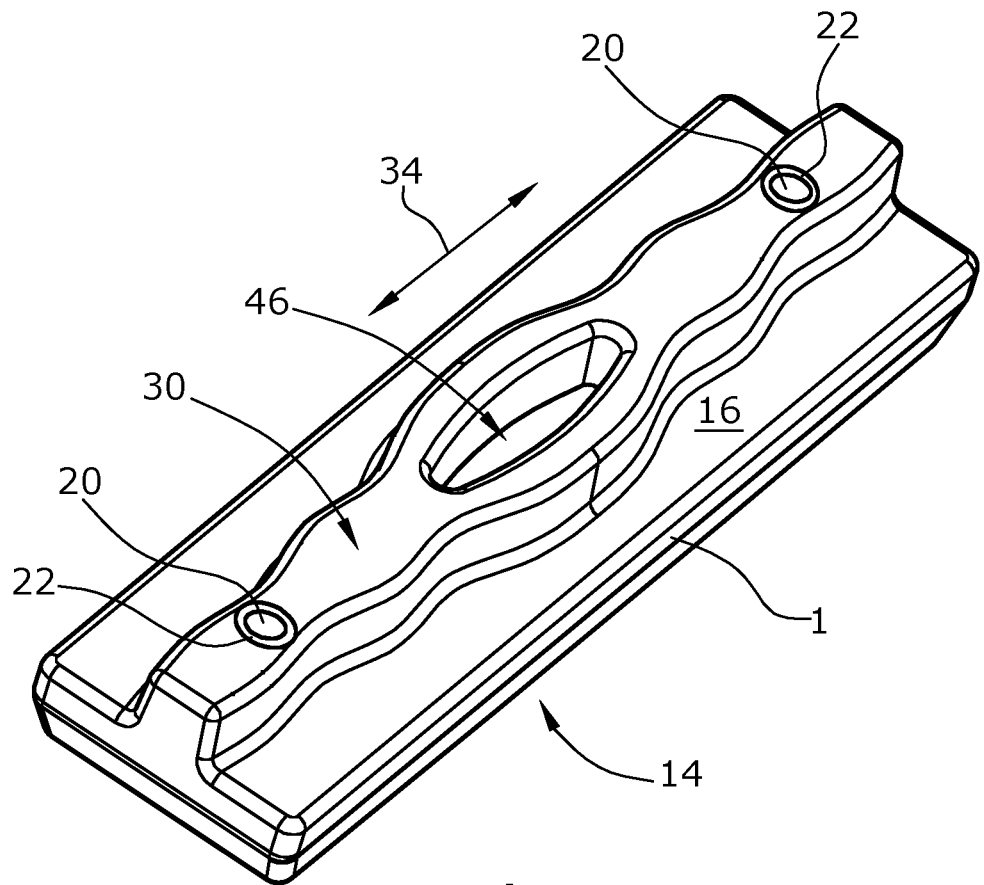
Figure 6:
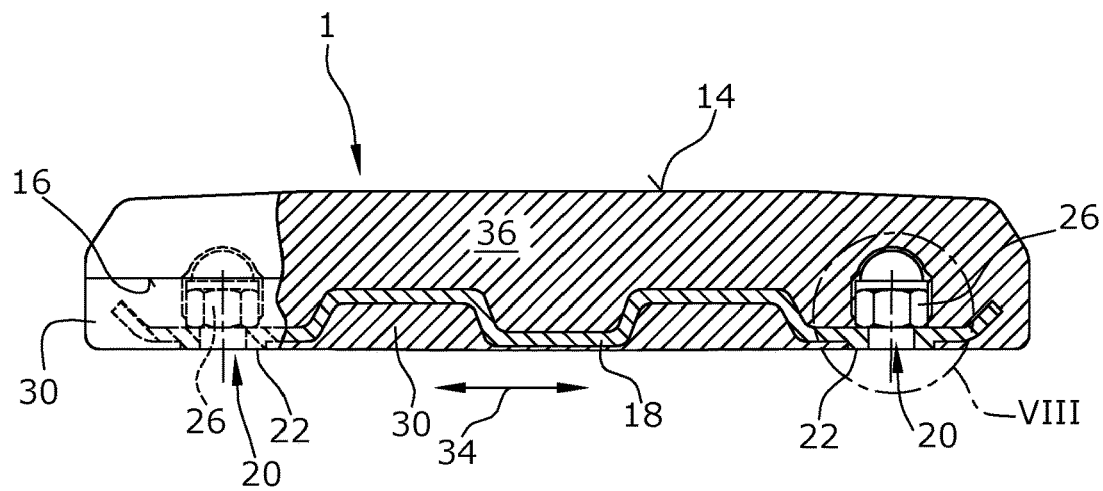
Figure 7:
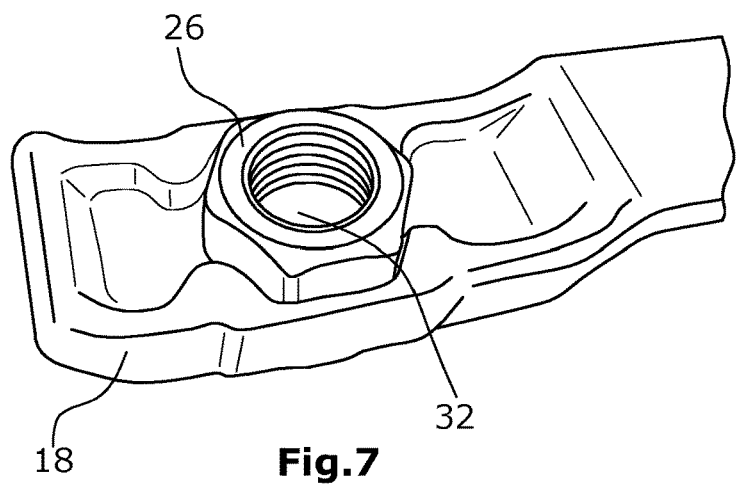
Figure 8:
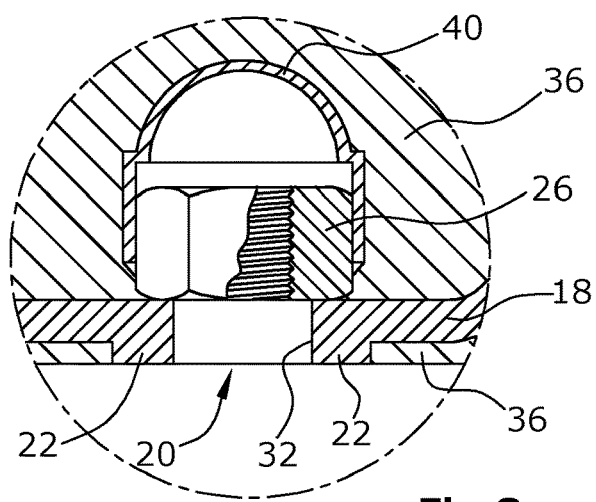
Figure 9:
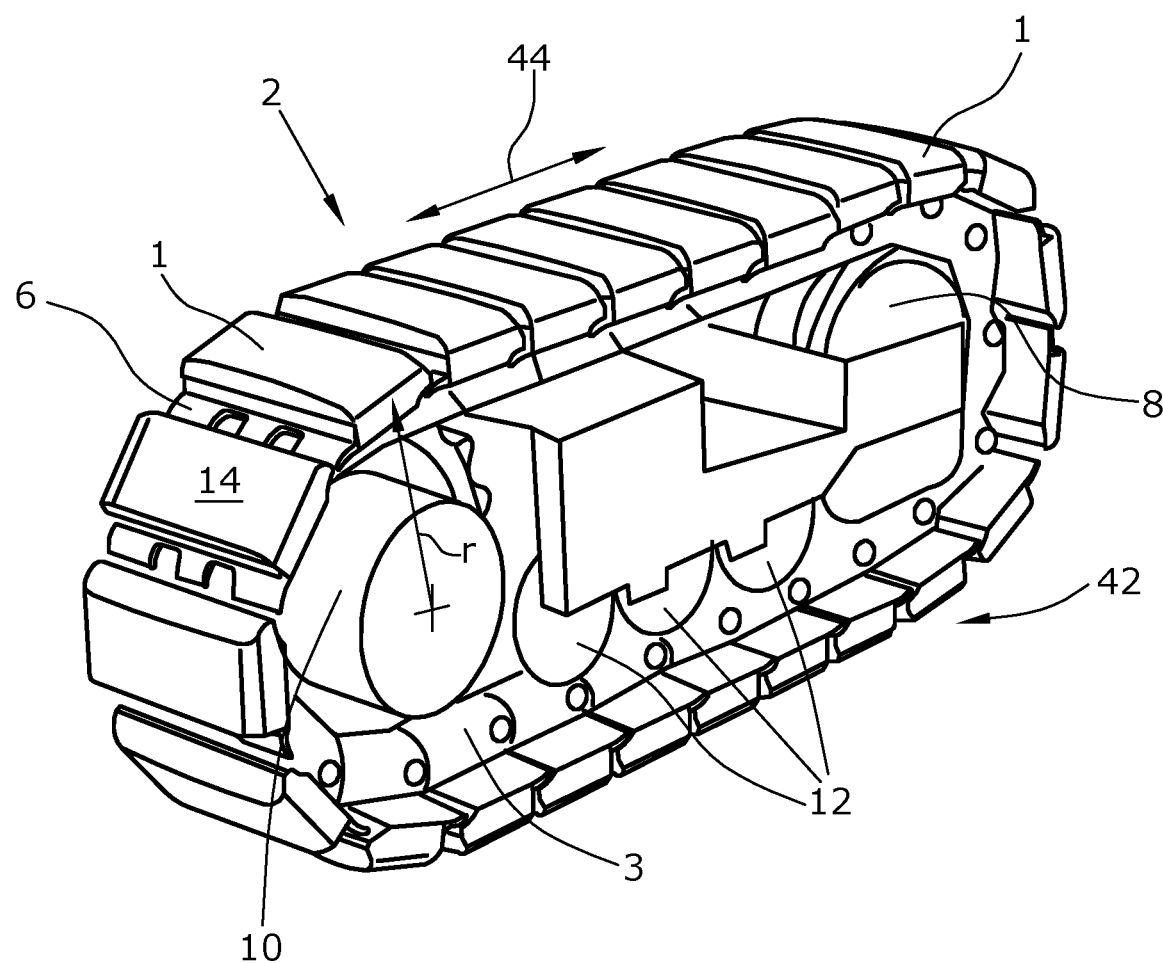
Figure 10:
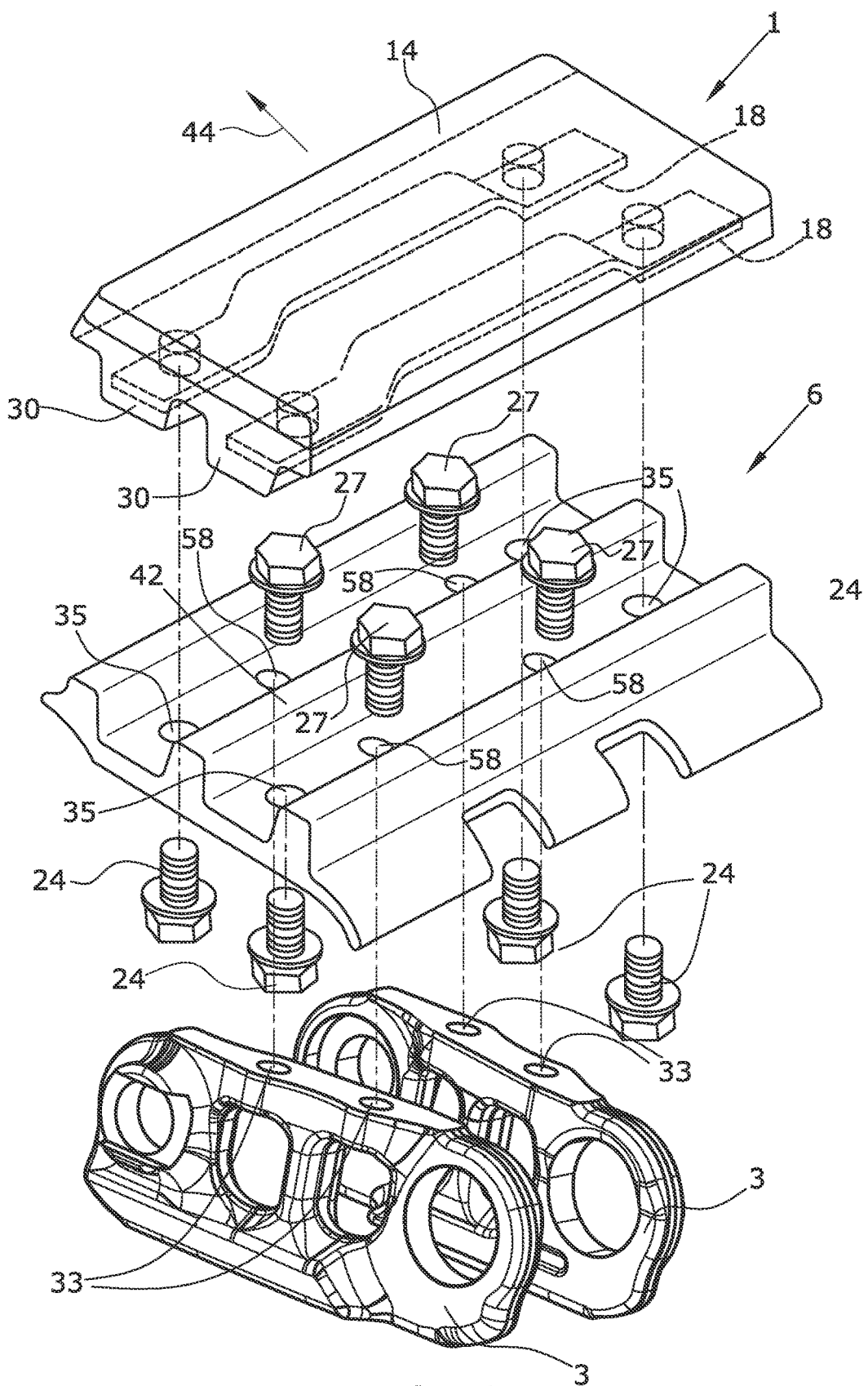

The following is shown:

FIG. 1 an exploded-view representation of a first embodiment of a wear pad according to the invention and of an associated crawler track link of a crawler track, FIG. 2 a perspective representation of a crawler track link from the inside with a wear pad according to the invention, FIG. 3 a perspective representation of the bottom side of the first embodiment of a wear pad, FIG. 4 a top view of the bottom side of a second embodiment, FIG. 5 a top view of the bottom side of a third embodiment, FIG. 6 a section of a protrusion with integrated reinforcing element, FIG. 7 an embodiment of a fastening means accommodated in the reinforcing element, FIG. 8 an enlarged representation of a detail according to FIG. 6, FIG. 9 a crawler track with wear pads in perspective view, and FIG. 10 an exploded-view drawing of a crawler track link with wear pad and intermediate plate in accordance with prior art.

FIG. 9 shows an embodiment of a crawler track 2 which runs on exchangeable wear pads 1. Such crawler tracks 2 revolving continuously in the direction of movement 44 are required in the ground-engaging units of a tracked vehicle, for example, a road milling machine.

The crawler track 2, with its track links 3 or crawler track links 4, respectively, revolves around two return rollers 8 and 10, one of which is driven. The return radius r is measured based on the outer radius of the crawler track 2 which equals approximately half the height of the crawler track 2. The ratio of the width of the wear pad 1 in the direction of movement 44 to the return radius r is in the range between 0.2 and 0.4, preferably between 0.25 and 0.3. The crawler track has a height of, for example, approx. 600 mm.

Such pitch improves the operational smoothness of the crawler track 2. In this design, the length-to-width ratio of the wear pad 1 is in the range between 2.5 and 5, preferably in the range between 3.5 and 4. The wear pad 1 has a length of, for example, approx. 300 mm, and a width of approx. 80 mm.

Multiple support rollers 12 are arranged in the lower return side of the crawler track 2 which support the machine weight and run on the track links 3.

FIGS. 1 to 3 show a perspective view of a first embodiment according to the invention of a crawler track link 4 with a wear pad 1 fastened directly to the crawler track link 4 without an intermediate plate 6. In the wear pad 1, fastening means 26 and fastening holes 20 for fastening screws 28 coaxial hereto are specified for fastening the exchangeable wear pad 1 to the crawler track link 4 adapted to the wear pad 1. To this end, the crawler track link 4 comprises through-holes 32, arranged coaxially to the fastening holes 20 of the wear pad 1, for accommodation of the fastening screws 28. In this design, the fastening means 26 are preferably arranged in the longitudinal direction of the wear pad 1 and preferably in the area of the free ends.

In contrast to the prior art according to FIG. 10, the crawler track links 4 require no intermediate plate 6 and are connected to one another in an articulated fashion via bearing eyes 50, 52, wherein the bearing eyes 50 engage with the bearing eyes 52 of a neighbouring crawler track link 4, and there are coupled to one another in an articulated fashion, for example, via a non-depicted bearing bolt. The wear pad 1 is preferably fastened to the crawler track link 4 with two fastening screws 28 only.

The embodiment according to FIGS. 1 and 3 shows a wear pad 1 comprising a protrusion 30 with a curved outer contour as seen in top view which may also be essentially elliptic in design.

In all of the embodiments, the wear pads 1 are preferably made of a wear pad material 36 reinforced as appropriate, preferably an elastomer material, for example, polyurethane which, in accordance with a particularly preferred embodiment, is through-coloured in a bright fluorescent colour, preferably signal yellow (RAL 1003).

It is also understood that, in contrast to FIG. 2, the protrusion 30 does not have to end flush with the end edges of the wear pad 1 in the longitudinal direction 34 but may also end shortly behind the fastening holes 20.

The wear pad 1 may preferably comprise cast-in reinforcing elements 18 which preferably extend in the longitudinal direction 34 of the wear pad 1. In the first embodiment, one reinforcing element 18 only is arranged in the wear pad 1. Fastening means 26 may be anchored in proximity to the free ends of a reinforcing element 18 which interact with fastening screws 28 through the through-bores 20 of the reinforcing element 18. It is understood that the fastening means 26 may alternatively also be made of screw bolts protruding vis-à-vis the wear pad 1 which, on the inner side of the crawler track link 4, are screw-fastened with a nut.

The wear pads 1 have a tread surface 14 on their outer side, as well as a bottom side 16 facing the crawler track link 4 which extends essentially parallel to the tread surface 14.

The fastening means 26 are suitable for accommodating fastening screws 28 that can be screwed in from the bottom side 16 of the wear pad 1. To this end, the crawler track links 4 comprise suitable through-bores 32 which extend coaxially to the fastening holes 20 and the fastening means 26 of the wear pad 1. It is essential in this design that at least one section 22 of the reinforcing element 18, in the mounted state of the wear pads 1, rests directly on the crawler track link 4 or terminates flush with the wear pad material 36.

In the first and all further embodiments, the reinforcing element 18 in the wear pad 1, for example, in the form of a reinforcing rail, extends in at least one protrusion 30 protruding, on the bottom side 16 of the wear pad 1, from the bottom side 16.

In this design, the reinforcing element 18 is preferably only specified in the longitudinally extending protrusion 30, and may follow the contour of the same in the sense that the reinforcing element 18 is essentially adapted to the outer contour of the protrusion 30 in the longitudinal direction 34. Provided that this is possible, as in the embodiment according to the FIGS. 1 to 3 as well as 6, for example, the reinforcing element 18 may also extend essentially rectilinearly in the longitudinal direction 34. The reinforcing element 18 may itself also form a part of the protrusion 30.

It is understood that the protrusion 30 may, for example, also be divided into two or more protrusions 30 in the longitudinal direction 34, or that two protrusions 30 extend essentially parallel to one another on the bottom side 16 of the wear pad 1.

FIG. 4 shows a perspective view of a wear pad 1 with an undulating protrusion 30 as seen in top view which protrudes from the bottom side 16 of the wear pad. The bottom side 16 rests on the crawler track link 4, wherein the protrusion 30 engages with a corresponding indentation 38 of the crawler track link 4.

The respective indentation 38 of the crawler track link 4 is adapted to the respective contour and shape of the protrusions 30, as they are evident from the FIGS. 1 to 5.

It is understood that the protrusion 30 is at least partially in engagement with the indentation 38 in such a fashion that a form-fit exists, as a minimum, in the longitudinal direction 34 of the wear pad 1. This does not require the protrusion 30 to completely match the contour of the indentation 38. Preferably, however, the protrusion 30 is designed complementary to the indentation 38 of the crawler track link 4.

In the embodiment according to FIG. 5, a protrusion protruding from the crawler track link 4 may also engage with a recess 46 of the protrusion 30 according to FIG. 5.

It is understood in this design that the reinforcing element 18 according to FIG. 5 may likewise comprise a recess corresponding to the recess 46 which the preferably complementary protrusion of the crawler track link 4 may engage with as appropriate with exclusively metallic contact.

The fastening holes 20 of the wear pad 1 are coaxial to the through-bores 32 of the crawler track link.

In the longitudinal direction 34 of the wear pad, the reinforcing element 18 terminates essentially flush with the wear pad material 36 in at least two points spaced in the longitudinal direction 34. The section 22 of the reinforcing element 18, which terminates essentially flush with the wear pad material 36, is preferably coaxial to the fastening hole 20 of the wear pad 1.

FIG. 6 shows a longitudinal section in the longitudinal direction 34 through the wear pad and the reinforcing element 18 integrated in the protrusion 30.

FIG. 7 shows a possible embodiment of an anti-torsion protection for the fastening means 26, which may be accommodated in the reinforcing element 18 in a sunken fashion.

The fastening means 26 may also be of integral design with the reinforcing element 18 or be fastened to the same, for example, by means of a non-detachable connection.

A protective cap 40 preferably sits on the fastening means 26 which, on the one hand, creates a free space for the free end of the fastening screw 28 during casting-in of the reinforcing element with the wear pad material 36, and prevents that wear pad material 36 can enter the thread of the fastening means 26. The fastening means 26 may alternatively also be a cap nut or a rivet nut.

In this embodiment, the section 22 of the reinforcing element 18, which is in contact with the crawler track link 4, is designed as an annular collar coaxial to the fastening hole 20.

It is not mandatory, however, for the section 22 of the reinforcing element to fully enclose the fastening hole 20.

As is evident from FIG. 10, the exchangeable wear pads 1 according to the prior art are fastened in a detachable fashion, via an intermediate plate 6, on track links 3 of the continuously revolving crawler track 2 coupled to one another in an articulated fashion.

FIG. 10 shows a perspective view of a wear pad 1 according to the prior art with the subjacent intermediate plate 6 which is in turn fastened to the track links 3. A total of four fastening screws 24 serve the purpose of fastening the wear pad 1 on the intermediate plate 6, and another four fastening screws 27 are screw-fastened, through through-holes 35 of the intermediate plate 6 and through-holes 33, with two track links 3 revolving parallel to one another.

All transverse forces occurring in the prior art are absorbed by the total of eight fastening screws 24, 27, loading the screw connections accordingly.

The embodiments according to FIGS. 1 to 8, on the other hand, require no intermediate plate 6 and can be fastened by means of only two fastening screws 28 in such a fashion that the screw connections are relieved from transverse forces to the greatest possible extent.

The crawler track 2 in the embodiments according to FIGS. 1 to 8 corresponds to the representation in FIG. 9 with the exception that the intermediate plate 6 and the track links 3 are replaced by crawler track links 4.

The invention claimed is:

1. A wear pad for a crawler track of a tracked vehicle, comprising:
    a body of elastomer wear pad material including:
        an outer tread surface;
        a bottom side opposite the tread surface;
        the body of elastomer wear pad material having a length defining a longitudinal direction, and a width perpendicular to the length; and
        at least one protrusion protruding from the bottom side and extending along a majority of the length of the body of elastomer wear pad material, the protrusion including a contour such that an imaginary plane parallel to the length and the width of the body of elastomer wear pad material is intersected by the contour at a line of intersection extending, at least partially, along the longitudinal direction of the wear pad at an angle deviating from the longitudinal direction of the wear pad;
    at least one reinforcing element having an upper side facing toward the outer tread surface and a lower side facing away from the outer tread surface, each of the upper and lower sides having a surface area, at least a majority of the surface area of each of the upper and lower sides of the reinforcing element being enclosed within the body of elastomer wear pad material, wherein the at least one reinforcing element is at least partially integrated in the at least one protrusion of the wear pad; and
    a fastener configured to fasten the wear pad to the crawler track.

2. The wear pad of claim 1, wherein:
    the fastener includes at least two fasteners arranged at a distance to one another in the longitudinal direction of the wear pad.

3. The wear pad of claim 1, wherein:
    the fastener includes at least two fasteners arranged at a distance to one another in the longitudinal direction of the wear pad; and
    the at least two fasteners are integrated in the reinforcing element.

4. The wear pad of claim 1, wherein:
    the at least one reinforcing element terminates essentially flush with the wear pad material in at least two areas spaced in the longitudinal direction, and the at least one reinforcing element is otherwise embedded in the at least one protrusion.

5. The wear pad of claim 4, wherein:
    the fastener includes at least two fasteners arranged at a distance to one another in the longitudinal direction of the wear pad and attached to the reinforcing element; and
    the at least two areas of the reinforcing element are arranged adjacent the at least two fasteners.

6. The wear pad of claim 1, wherein:
    a length-to-width ratio of the wear pad is in a range of from 2.5 to 5.0.

7. The wear pad of claim 6, wherein:
    the length-to-width ratio of the wear pad is in a range of from 3.5 to 4.0.

8. The wear pad of claim 1, in combination with the crawler track, wherein:
    the wear pad protrudes relative to the crawler track at least on an outer side of the crawler track as seen transverse to a direction of movement of the crawler track.

9. The wear pad of claim 1, in combination with the crawler track, wherein:
    a ratio of the width of the body of wear pad material to a return radius of the crawler track is in a range from 0.2 to 0.4.

10. The wear pad of claim 1, in combination with the crawler track, wherein:
    a ratio of the width of the body of wear pad material to a return radius of the crawler track is in a range from 0.25 to 0.3.

11. The wear pad of claim 1, wherein:
    the line of intersection extends, at least in part, non-linearly in the longitudinal direction.

12. The wear pad of claim 11, wherein:
    the line of intersection extends in a curved fashion relative to the longitudinal direction.

13. The wear pad of claim 11, wherein:
    the line of intersection extends in an undulating fashion relative to the longitudinal direction.

14. The wear pad of claim 1, wherein:
    the line of intersection extends, at least in part, linearly in the longitudinal direction.

15. The wear pad of claim 14, wherein:
    the line of intersection extends in an oblique fashion relative to the longitudinal direction.

16. The wear pad of claim 14, wherein:
    the line of intersection extends in an angular fashion relative to the longitudinal direction.

17. The wear pad of claim 1, wherein:
    the at least one protrusion has a changing width in the longitudinal direction.

18. The wear pad of claim 1, wherein:
    the at least one protrusion is of stepped design.

19. The wear pad of claim 1, wherein:
    the elastomer wear pad material comprises polyurethane.

20. The wear pad of claim 1, wherein:
    the elastomer wear pad material is colored in a bright color throughout the elastomer wear pad material.

21. The wear pad of claim 1, wherein:
    the elastomer wear pad material is colored in yellow throughout the elastomer wear pad material.

22. The wear pad of claim 1, wherein:
    the elastomer material is colored in a fluorescent color throughout the elastomer material.

23. The wear pad of claim 1, in combination with the crawler track, and the tracked vehicle, the tracked vehicle being a milling machine including multiple crawler track links continuously revolving in a direction of movement, the crawler track links being coupled to one another in an articulated fashion, each crawler track link including at least one wear pad fastened to an outer side of the crawler track link.

\* \* \* \* \*